United States Patent Office 3,426,135
Patented Feb. 4, 1969

3,426,135
PENTACHLOROBENZYL ALCOHOL, ACETATE, PROPIONATE AND BUTYRATE FOR COMBATTING RICE BLAST
Hiroji Sumi, Yukiyoshi Takahi, Yasuhiko Kondo, and Yoshio Hamamoto, Yasu-gun, and Tsunehiko Nishimura, Hiraoka, Japan, assignors to Sankyo Company, Limited, and Dainippon Ink & Chemicals, Incorporated, Tokyo, Japan
No Drawing. Filed Oct. 27, 1964, Ser. No. 406,880
Claims priority, application Japan, Nov. 1, 1963, 38/58,487; Sept. 25, 1964, 39/54,864
U.S. Cl. 424—311            4 Claims
Int. Cl. C07c 39/36; A01n 9/26

ABSTRACT OF THE DISCLOSURE

This invention relates to agricultural fungicidal compositions, more particularly, compositions suitable for the treatment of plant diseases caused by pathogenic fungi, especially of rice blast caused by *Piricularia oryzae*, the compositions containing an active ingredient and a carrier for the same; as active ingredients we use pentachlorobenzyl alcohol or aliphatic monocarboxylic acid esters thereof; as carrier an inert or fungicidal material known per se.

Summary of the invention

Heretofore it has been generally known to use a number or organic mercury compounds for the practical treatment of rice blast.

However, it has also been known that such organic mercury compounds are very harmful to man and to animals. Especially when applied to food, plants, mercury or organic mercury compounds tend to remain in the crops unchanged, so that humans and animals that take in such plants contract chronic toxicosis of mercury.

It is therefore highly desirable to replace the fungicidal compositions having the above disadvantages by harmless and effective fungicidal compositions free of the mentioned shortcomings.

It is an object of the present invention to provide new agricultural fungicidal composition which contain as an active ingredient a mercury-free compound available at low cost, and which exhibit the excellent effect of preventing and controlling plant diseases, especially rice blast, without even a minimum degree of phytotoxicity.

Other objects of the present invention will be apparent from the following detailed description.

As a result of studies for overcoming the above-mentioned disadvantages, we have found that pentachlorobenzyl alcohol and aliphatic monocarboxylic acid esters thereof exhibit a remarkable and unexpected effect for the prevention and control of plant diseases, especially of rice blast.

Pentachlorobenzyl alcohol used in the composition according to the present invention is a known compound which is a solid substance melting at 197–198° C. and may be prepared by any of the known methods.

Pentachlorobenzyl alcohol aliphatic monocarboxylic acid esters used in the composition according to the present invention are also known and may be prepared by the usual esterification of pentachlorobenzyl alcohol with the corresponding aliphatic monocarboxylic acid.

The aliphatic monocarboxylic acid to be employed in the above-described esterification may be any kind of aliphatic monocarboxylic acid that will not prevent the fungicidal effect of pentachlorobenzyl alcohol; in view of their commercial availability, lower aliphatic monocarboxylic acids, such as acetic acid, propionic acid, or butyric acid are preferred.

The compounds used in the composition according to the present invention may be made by known methods and used in various forms including liquids, dusts, granules, wettable powders, and so on.

Liquids may be prepared by dissolving the said active compounds in a suitable solvent such as water, alcohols, acetone, benzene, toluene, xylene, solvent naphtha and petroleum ether, with one or more of a number of additives. For example, the condensation products of alkylene oxides with phenols or organic acids, alkyl aryl sulfonates, polyoxyethylene derivatives of complex ether alcohols, and the like, may be used for the said purpose.

Dusts and granules may be prepared by mixing the said active compounds with an inert solid carrier such as clay, talc, pyrophylite, attaclay, diatomaceous earth, bentonite, vermiculite and the like. Wettable powders may be prepared by mixing the said active compounds with the above-mentioned solid carriers and with solid dispersing agent, such as alkylbenzenesulfonates, other surface active dispersing agents and the like, which are used for the preparation of liquid compositions. Wettable powders are made ready for use by diluting with the required amount of water. The amount of water may be varied within the wide range sufficient to produce the fungicidal effect of the active compounds.

Other formulations comprising active ingredients of the present invention together with inert carriers and/or dispersing agents are prepared by similar methods.

The above-mentioned compositions may also contain another additive or adjuvant for promoting the effectiveness of the active compounds and stabilizing the formulations.

The compositions can also be mixed with the other fungicides or insecticides to afford joint action.

To illustrate the effectiveness of the compositions of the present invention, the results of tests made with the present compounds together with other known fungicides are given below:

The test for the preventive and controlling effects against rice blast (*Piricularia oryzae*)

A. Test for the effect in prevention of rice blast (1) Host plant.—Rice plant (variety: Shigaasahi-No. 27)
(2) Fungus.—*Piricularla oryzae*
(3) Experimental method.—The tested compositions are applied to 2 test pots with 30 ml. portions, and then the spores of fungus (*Piricularia oryzae*) are inoculated. After being allowed to stand in the room for 48 hours at a temperature of 20–25° C. and at a relative humidity of above 95%, the test pots are placed in the greenhouse at the temperature of 24–26° C.

After 3 days at that temperature, the preventing effect is investigated according to the method indicated below.

(4) Method of investigation.—Diseased spots in the upper 2 leaves of the host plant are measured and the total area of diseased spot is determined to define the damage degree as indicated hereinbelow.

| Damage degree: | Total area of diseased spot, percent |
|---|---|
| 5 | Above 80 |
| 4 | 60–80 |
| 3 | 40–60 |
| 2 | 20–40 |
| 1 | Below 20 |
| 0 | Not diseased |

(5) Experimental results:

| Chemicals | Concentration of chemicals (p.p.m.) | Damage degree/leaf | | | Phytotoxicity |
|---|---|---|---|---|---|
| | | 1st pot | 2nd pot | Average | |
| Pentachlorobenzyl alcohol | 1,000 | 0.5 | 0.5 | 0.5 | |
| Do | 300 | 1.2 | 1.0 | 1.1 | |
| Pentachlorobenzyl acetate | 1,000 | 0.5 | 0.4 | 0.5 | |
| Do | 300 | 1.2 | 1.2 | 1.2 | |
| Pentachlorobenzyl butyrate | 1,000 | 0.5 | 0.5 | 0.5 | |
| Phenylmercury acetate | [1] 30 | 0.9 | 1.1 | 1.0 | |
| Do | [1] 10 | 1.7 | 1.3 | 1.5 | |
| Untreated | | 5.0 | 5.0 | 5.0 | |

[1] As Hg.

B. Test for the controlling effect against rice blast (1) Host plant.—The same plant as described in above A is used.

(2) Fungus.—The same fungus as described in above A is used.

(3) Experimental method.—Two pots containing host plants inoculated with tested fungus are allowed to stand in the room for 48 hours at a temperature of 20–25° C. and at a relative humidity of above 95%, and the tested composition is applied to the pots, which are then placed in the greenhouse at the temperature of 24–26° C. After 3 days at that temperature, the controlling effect is investigated according to the method indicated below.

(4) Method of investigation.—The same method as described in above A is used.

(5) Experimental results:

| Chemicals | Concentration of chemicals (p.p.m.) | Damage degree/leaf | | | Phytotoxicity |
|---|---|---|---|---|---|
| | | 1st pot | 2nd pot | Average | |
| Pentachlorobenzyl alcohol | 1,000 | 4.3 | 4.8 | 4.6 | |
| Do | 300 | 4.7 | 4.8 | 4.8 | |
| Pentachlorobenzyl acetate | 1,000 | 3.8 | 4.0 | 3.9 | |
| Do | 300 | 4.7 | 4.7 | 4.7 | |
| Pentachlorobenzyl propionate | 1,000 | 4.0 | 3.8 | 3.9 | |
| Phenylmercury acetate | [1] 30 | 3.2 | 3.2 | 3.2 | |
| Do | [1] 10 | 3.9 | 4.5 | 4.2 | |
| Untreated | | 5.0 | 5.0 | 5.0 | |

[1] As Hg.

C. Fungicidal field test for rice blast.—Test 1

(1) Plot.—3 plots for each compound, 20 m.² in each plot.

(2) Date of application.—August 3 (before head sprout), August 11 (after head sprout).

(3) Date of investigation.—August 31.

(4) Host plant.— Rice plant (variety: Ibuki).

(5) Preparation and dosage:

| Chemicals | Form | Spray volume |
|---|---|---|
| Pentachlorobenzyl alcohol | 3% dust | 3 kg./10 a. |
| Pentachlorobenzyl acetate | do | 3 kg./10 a. |
| Bla-S-M (the name of the composition containing 0.1% of blasticidin S and 0.1= of phenylmercury acetate). | Dust | 3 kg./10 a. |
| Meran (the registered trademark of Sankyo Company Ltd.; the composition containing 0.35% of phenylmercury acetate). | do | 3 kg./10 a. |

(6) Results:

| Chemicals | Number of— | | Damage degree* | Damage index | Phytotoxicity |
|---|---|---|---|---|---|
| | Investigated head | Diseased head | | | |
| Pentachlorobenzyl alcohol | 2,978 | 173 | 2.83 | 20.43 | |
| Pentachlorobenzyl acetate | 3,082 | 197 | 3.29 | 23.75 | |
| Bla-S-M | 3,051 | 245 | 4.55 | 37.85 | |
| Meran | 3,063 | 292 | 5.70 | 41.52 | |
| Untreated | 3,132 | 629 | 13.85 | 100.00 | |

*Damage degree = $\frac{(3 \times N_3)+(2 \times N_2)+(1 \times N_1)}{3 \times (\text{Number of investigated head})}$ $N_3$—Number of severely damaged heads.
$N_2$—Number of moderately damaged heads.
$N_1$—Number of slightly damaged heads.

Test 2

(1) Plot.—3 plots for each compound, 1.8 m.² in each plot.

(2) Date of application.—July 11.

(4) Date of investigation.—July 19.

(4) Host plant.—Rice plant (variety: Sasashigure).

(5) Preparation and dosage:

| Chemicals | Form | Dilution rate | Spray volume |
|---|---|---|---|
| Pentachlorobenzyl alcohol | 50% wettable powder. | 1:1,000 | 330 ml./1.8 m.² |
| Blasticidin | 2% wettable powder. | 1:1,000 | 330 ml./1.8 m.² |

(6) Results:

| Chemicals | Disease index* (average of 3 pots) | |
|---|---|---|
| | 4th leaves | 5th leaves |
| Pentachlorobenzyl alcohol | 1.3 | 1.3 |
| Blasticidin | 1.3 | 2.0 |
| Untreated | 5.0 | 4.3 |

*Disease index: 1—no spot of disease; 2—1–10 spots of disease; 3—11–50 spots of disease; 4—51–100 spots of disease; 5—above 100 spots of disease.

Test 3

(1) Plot.—4 plots for each compound, 1m.² in each plot.

(2) Date of applications.—July 23, August 6, August 11, August 17.

(3) Date of investigation.—August 27.

(4) Host plant.—Rice plant (variety: Norin-No. 29).

(5) Preparation and dosage:

| Chemicals | Form | Dilution rate | Spray volume |
|---|---|---|---|
| Pentachlorobenzyl alcohol | 50% wettable powder. | 1:1,000 | 100 l./10 a. |
| Phenylmercury acetate | 0.42% dust | | 3 kg./10 a. |

(6) Results:

| Chemicals | Damage degree* (average of 4 pots) | Phytotoxicity |
|---|---|---|
| Pentachlorobenzyl alcohol | 1.4 | |
| Phenylmercury acetate | 1.6 | |
| Untreated | 3.5 | |

*Damage degree: 0—no diseased spot; 1—several diseased spots; 2—slightly damaged spots; 3—moderately damaged spots; 4—severely damaged spots; 5—almost all host plants dead.

From the above-mentioned results, it is clearly to be seen that pentachlorobenzyl alcohol and aliphatic monocarboxylic acid esters thereof in the compositions of the present invention have an excellent effect on rice blast. Accordingly, these compounds are very useful as agricultural fungicides.

The following examples illustrate the invention, but are not to be construed as limiting the same.

Example 1

5 parts by weight of pentachlorobenzyl alcohol and 95 parts by weight of clay are mixed and pulverized to form a dust.

Example 2

3 parts by weight of pentachlorobenzyl alcohol and 97 parts by weight of talc are mixed and pulverized to form a dust.

Example 3

10 parts by weight of pentachlorobenzyl alcohol, 1 part by weight of polyvinyl alcohol, 3 parts by weight of sodium salt of sulfonated cetylalcohol and 86 parts by weight of clay are mixed and pulverized to yield a wettable powder.

Example 4

5 parts by weight of pentachlorobenzyl acetate and 95 parts by weight of clay are mixed and pulverized to form a dust.

Example 5

3 parts by weight of pentachlorobenzyl butyrate and 97 parts by weight of talc are mixed and pulverized to form a dust.

Example 6

10 parts by weight of pentachlorobenzyl propionate, 1 part by weight of polyvinyl alcohol, 3 parts by weight of sodium salt of sulfonated cetylalcohol and 86 parts by weight of clay are mixed and pulverized to form a wettable dust.

We claim:

1. A method for combatting rice blast which comprises applying to the rice blast fungi a composition comprising an effective amount of pentachlorobenzyl alcohol, pentachlorobenzyl acetate, pentachlorobenzyl propionate or pentachlorobenzyl butyrate and a carrier therefor.

2. A method for combatting rice blasts which comprises applying to rice plants an effective amount of pentachlorobenzyl acetate in an inert carrier.

3. A method for combatting rice blast which comprises applying to rice plants an effective amount of pentachlorobenzyl propionate in an inert carrier.

4. A method for combatting rice blast which comprises applying to rice plants an effective amount of pentachlorobenzyl butyrate in an inert carrier.

References Cited

UNITED STATES PATENTS

| | | | |
|---|---|---|---|
| 2,861,097 | 11/1958 | Senkbeil et al. | 167—30 XR |
| 2,945,782 | 7/1960 | Schraufstatter et al. | 167—30 |
| 3,123,528 | 3/1964 | Fenton | 167—87 XR |

OTHER REFERENCES

Chemical Abstracts I, vol. 44: Column 2462 (1950).
Chemical Abstracts II, vol. 46: Col. 11547g (1952).

ALBERT T. MEYERS, *Primary Examiner.*

V. C. CLARKE, *Assistant Examiner.*

U.S. Cl. X.R.

424—343